US006284158B1

(12) United States Patent
Marshall et al.

(10) Patent No.: US 6,284,158 B1
(45) Date of Patent: *Sep. 4, 2001

(54) PUMPABLE HEAT TRANSFER COMPOSITION

(75) Inventors: Mary C. Marshall; Herman W. Schlameus; Richard J. Mannheimer, all of San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/325,155

(22) Filed: Jun. 3, 1999

Related U.S. Application Data

(63) Continuation-in-part of application No. 08/605,680, filed on Feb. 22, 1996, now Pat. No. 6,063,312, which is a continuation of application No. 08/014,186, filed on Feb. 5, 1993, now abandoned.

(51) Int. Cl.[7] ........................................... H01B 3/20
(52) U.S. Cl. .................. 252/572; 252/574; 252/578; 252/90; 428/212; 427/402
(58) Field of Search .................... 252/572, 574, 252/578, 70; 428/212; 427/402; 165/53

(56) References Cited

U.S. PATENT DOCUMENTS

| | | |
|---|---|---|
| 3,596,713 | 8/1971 | Katz . |
| 4,221,259 | 9/1980 | Ronc et al. . |
| 4,237,023 | 12/1980 | Johnson et al. . |
| 4,259,401 | 3/1981 | Chahroudi et al. . |
| 4,273,100 | 6/1981 | Cogliano . |
| 4,287,076 | 9/1981 | Babin et al. . |
| 4,292,189 | 9/1981 | Chen . |
| 4,708,812 | 11/1987 | Hatfield . |
| 4,715,978 | 12/1987 | Yano et al. . |
| 4,793,402 | 12/1988 | Yano et al. . |
| 4,825,939 | 5/1989 | Salyer et al. . |
| 4,908,166 | 3/1990 | Salyer . |
| 5,053,446 | 10/1991 | Salyer . |
| 5,106,520 | 4/1992 | Salyer . |
| 5,282,994 | 2/1994 | Salyer . |
| 5,387,370 | 2/1995 | Tomizawa . |
| 5,569,642 | * 10/1996 | Lin ........................................ 507/103 |

OTHER PUBLICATIONS

L.J. Gochwender, et al., Journal of the American Society of Lubrication Engineers, "Polyalphaolefins as Candidate Replacements for Silicate Ester Dielectric Coolants in Military Applications" presented May 7–10, 1994, Chicago, Illinois.

* cited by examiner

Primary Examiner—Necholus Ogden
(74) Attorney, Agent, or Firm—Paula D. Morris & Associates, P.C.

(57) ABSTRACT

The invention relates to pumpable heat transfer compositions wherein a solid polymeric porous structure having absorbed therein a polar or non-polar phase change material is incorporated with a heat transfer carrier liquid, with the phase change material being present in an amount sufficient to increase the heat capacity and/or heat transfer coefficient of the carrier liquid. The invention also relates to the method of increasing the heat capacity and/or heat transfer coefficient of a heat transfer carrier liquid by adding thereto a solid polymeric porous structure having absorbed therein a polar or non-polar phase change material.

44 Claims, 1 Drawing Sheet

PUMPABLE HEAT TRANSFER COMPOSITION

CROSS-REFERENCE TO RELATED APPLICATION

The instant application is a Continuation-in-part of application Ser. No. 08/605,680 filed Feb. 22, 1996 now U.S. Pat. No. 6,063,312 which, in turn, is a Continuation of application Ser. No. 08/014,186, filed Feb. 5, 1993 now abandoned.

BACKGROUND OF THE INVENTION

The present invention relates to pumpable heat transfer compositions and to the method of making the same.

It is known to utilize heat transfer compositions for a wide variety of purposes, such as coolants, heat sources, increased efficiency from constant temperature fluids, and reduction of peak load energy requirements by storage potential, as well as in other areas in order to increase the potential benefits from solar energy and waste heat collection. There are a number of materials that have been utilized for this purpose with those having the highest heat capacities and heat transfer coefficients being those most suitable for this purpose. Examples of such known heat transfer materials are water, certain glycols, hydrocarbons, fluorinated hydrocarbons, and the like. For certain uses, such as military applications, where it is desired to use dielectric coolants in aircraft radar and missile systems and other avionic components, it has long been known to utilize silicate-ester based coolants and more recently the readily available hydrogenated polyalphaolefin (PAO) based fluids. However, even the PAO's do not have a satisfactorily high heat capacity and heat transfer coefficient. Attempts to add a phase change material (PCM) thereto in order to increase the heat capacity and heat transfer coefficient of the PAO's have not been entirely successful.

Also, at the present time hydrophilic silicates are utilized as the solid microporous structure to carry the PCM's. If silicates do break during pumping, they will still absorb the PCM and would continue to function.

One cannot utilize any PCM soluble in the PAO, such as a paraffin, since it will solidify the entire composition and the use of an insoluble PCM will solidify in the heat rejector and plug up the flow lines.

Efforts to overcome some of these problems have included encapsulating the PCM's. The phase change of interest is a liquid to solid and vice versa with heat transfer equivalent to the latent heat of solidification (preferably crystallization). Use of PCM's, soluble in the PAO, is not satisfactory since the PCM and PAO being soluble in each other diffuse through the capsule shell and one then has the same problems as before. Capsules also have a tendency to rupture due to, at least, thermal cycling and pumping. The resultant capsule breakage and the loss of the PCM will degrade the thermal properties of the heat transfer composition, thus, vitiating the beneficial effects of the PCM. Thus, even if an insoluble PCM is utilized, capsule breakage will also eliminate its beneficial effects.

For other heat transfer applications, microcapsules containing PCM are impractical because of eventual breakage through pumps and flow channels. For example, this is known for water-based and glycol-based slurries containing paraffin PCM's within nylon-coated microcapsules. This was demonstrated by the U.S. Army in cooling vest applications.

SUMMARY OF THE INVENTION

A novel heat transfer composition has now been found which overcomes the problems of the prior art.

Briefly stated, the present invention comprises a pumpable heat transfer composition comprising a carrier liquid and a solid polymeric porous structure having absorbed therein a polar or non-polar phase change material (but insoluble in the carrier liquid). Preferably, the phase change material is absorbed in the solid microporous structure before being admixed with the carrier liquid.

The invention also includes the method of making the composition and the encapsulated porous structure as hereinafter forth.

BRIEF DESCRIPTION OF THE DRAWING

The single drawing is a graph comparing the DSC results of several levels of entrapped materials as compared to the pure pentadecane.

DETAILED DESCRIPTION

Figure 1:
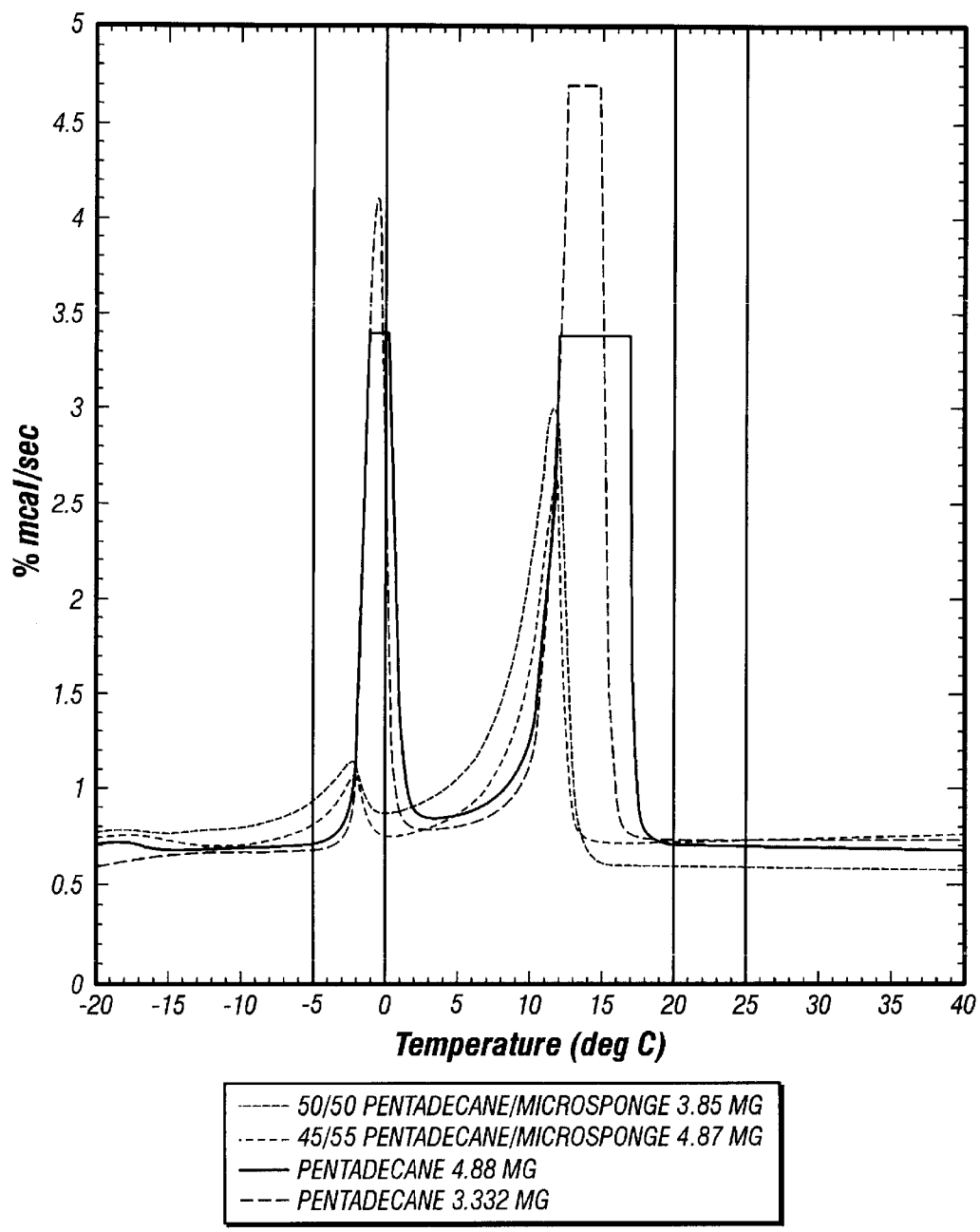

While the pumpable composition of the present invention can be utilized for a wide variety of uses such as for solar energy capture and waste-heat collection, it will be more particularly described with respect to dielectric coolants in military applications and water-based cooling systems for industrial and climate control applications.

For military applications, the term "carrier liquid" as used herein refers to the PAO or other non-polar liquids and the fact that the said solids, such as the microporous structure and capsules, if used, are suspended therein. For industrial applications, the term "carrier liquid" refers to water or other polar material.

Also, although a wide variety of heat transfer compositions can be utilized such as water, silicate ester fluids, hydrogenated polyalphaolefin-based fluids (PAO's), and the others noted above, the invention will be described in connection with the PAO's.

In like manner, in describing the phase change material, it will be clear that a wide variety of compounds can be utilized. Examples are polyoxyethylene $C_{12}$–$Cl_{18}$ esters, such as polyoxyethylene cetyl ether and polyoxyethylene stearyl ether; polyethylene glycols; and decanes of the formula $CH_3(CH_2)_xCH_3$ where x is 8 to 17, such as pentadecane, n-heptadecane, and n-octadecane; paraffins, and the like. The particular one chosen will depend upon the nature of the carrier liquid, as is evident to those skilled in this art.

The invention will be particularly described with respect to the use of a polyethylene glycol, and the polyoxyethylene stearate which are polar PCM's and pentadecane which is the preferred non-polar PCM.

The microporous structure used to entrap the PCM's is any porous polymeric material, such as MICROSPONGE®, an acrylate copolymer consisting of discrete 15–35 micron size open spherical particles that are oleophilic and moderately hydrophilic, making it useful for both types of phase change materials, and POLYTRAP®, an acrylate copolymer consisting of amorphous open agglomerates 20–80 microns in size that are oleophilic, and open-pored silicone polymers (DC9503 silicone from Dow Corning which is amorphous and oleophilic). Both of these porous polymers are produced by Advanced Polymer Systems of Redwood City, Calif. Also suitable are sintered colloidal silica particles (such as Cab-o-Sil 610 from Cabot Corporation).

It has been found that the entrapment of the phase change material, such as pentadecane, does not significantly change the melting point thereof. This is borne out in the attached drawing. The single figure is a graph comparing the differential scanning calorimeter (DSC) results of several levels of entrapped material versus the pure pentadecane. The different peak widths result from the different amounts of material tested; i.e., the particles containing 45% or 55% pentadecane.

As to the polyethylene glycol utilized, it can have molecular weights ranging from as low as 300 to as high as 5,000, or mixtures thereof, either with other polyethylene glycols or with water. The particular composition will depend on the approximate melting point desired for the particular PCM and the properties desired of the heat transfer composition. Table I set forth below shows various blends of polyethylene glycol with the numeral following the PEG standing for the molecular weight of the material and the resultant approximate melting point.

TABLE I

| PEG COMBINATIONS | APPROXIMATE MELTING POINT |
| --- | --- |
| 50% PEG 300 50% PEG 1000 | 31–33° C. |
| 50% PEG 300 50% PEG 3350 | 47–52° C. |
| 70% PEG 300 30% PEG 4600 | 47–50° C. |
| 75% PEG 3500 25% WATER | 30° C. |

As to proportions, the amount of PCM added is that desired or necessary to obtain the requisite heat transfer characteristics. The optimum amount can be determined by routine experimentation. It has been found that ordinarily 10% to 50% by volume of the pumpable heat transfer composition can be the PCM.

In the event an aqueous coolant is to be used, the microporous structure must be treated with a coupling agent to preferentially make it oil-wet or to use microporous structures that are initially preferentially oil-wet such as Cab-o-Sil 610 sold by Cabot and PCM's must be used that are insoluble in water, such as normal paraffins.

A preferred first step in using the phase change material is to have it absorbed in a solid microporous structure.

In one embodiment, the solid microporous structure is a chemical absorbent, such as amorphous silica, usually aggregates of extremely small particles, of about 0.02 microns. Such silica aggregates have internal porosities or voids close to 80% of the total volume of the amorphous silica.

Other materials that can be used in place of the amorphous silica are aluminosilicates, zeolites, and molecular sieves. As used herein the term "molecular sieves" refers to microporous structures composed of either crystalline aluminosilicates, chemically similiar to clays and feldspars and belonging to a class known as zeolites, or crystalline aluminophosphates derived from mixtures containing an organic amine or quaternary ammonium salts. The pores sizes of these materials vary widely usually in the Angstrom range with the channels comprising up to 50% of the total volume of the material used.

In another embodiment, the solid microporous structure is a polymeric microporous structure. It is preferred to utilize a highly cross-linked acrylate copolymer (MICROSPONGE®) since it entraps the non-polar PCM's more effectively than the highly cross-linked polymethacrylate copolymer (POLYTRAP) or DC 9503 silicone polymer.

For the most effective use of the PCM in the instant invention, all that is required is to admix the requisite amount of PCM with the minimum amount of the solid polymeric microporous material capable of absorbing the PCM. That is to say, if one is to utilize a certain volume of the PCM material for any given PAO, it is only necessary to add that amount to the amount of solid microporous material that can absorb the same. The necessary amounts of microporous material needed to absorb the requisite amount of PCM for any given PCM and microporous material can be readily determined by routine experimentation involving mixing differing amounts of the microporous materials with the PCM. It is preferred to heat the mixture above the melting point of the PCM and under vacuum to remove any entrapped air to ensure absorption.

After the PCM has been absorbed, the resultant dry material, the solid microporous structure having absorbed in the pores thereof the liquid PCM, is then added to the PAO in the amount necessary to give the desired heat transfer characteristics; i.e., heat capacity and/or heat transfer coefficient. Larger increases in heat capacity and/or heat transfer coefficients and/or different operating temperatures for optimum performance can be accomplished in some instances by utilizing higher loadings of the PCM or utilizing PCM's with a different melting point, the variations in the melting point have been described in Table I above.

Of significance with the instant invention is the fact even if the particular dielectric coolant is subjected to extensive cycling and pumping resulting in any mechanical fracturing of the microporous solids, there is no significant leakage of the liquid or solid PCM due to this breakage since the PCM is held in the internal pores of the solid agglomerates.

A further embodiment of the present invention is to utilize the capsules containing the PCM to form a slurry of the same in the PAO, but to add to the PAO-PCM mixture an amount of the solid microporous material capable of absorbing at least 50% and preferably 100% of the PCM utilized. In this way if there is any PCM released due to capsule breakage, before it can cause any blockage of flow lines downstream of the filter, it will be absorbed by the solid micro-pore structures. As has been noted the solid polymeric microporous structures used herein has a preferential wettability (attraction or affinity) for the PCM and even though initially saturated by the PAO, the PAO will be displaced by the PCM. It will be evident that any encapsulating procedure previously used to coat polar and non-polar PCM's can be used to encapsulate the polyethylene glycol or other polar PCM used herein.

EXAMPLE I

Pentadecane is absorbed into Microsponge® in the ratio of 45% by weight pentadecane to 55% by weight MICROSPONGE® 5640. The liquid pentadecane is added slowly to the polymeric spheres and mixed to distribute the material evenly. The material is then placed under a vacuum of 27 inches of water for 15 minutes to remove any entrapped air. After removing from the vacuum, the material is dispersed in water containing a surfactant, TRITON X-100. In this form, the slurry can be used as a heat transfer medium. Final composition of the slurry was as follows:

|  | % by wt. |
| --- | --- |
| MICROSPONGE ® 5650 | 18.3 |
| Pentadecane | 15.0 |
| Water | 66.7 |

The plus addition of TRITON X-100 is 0.4% by weight.

The dispersion was not oily, the water remained relatively clear indicating there is no free oil, and it remained liquid on cooling below the freezing point of pentadecane.

EXAMPLE 2

The process of Example 1 was repeated, except that the ratio of pentadecane to MICROSPONGE® was 40:60. The results were the same as for Example 1; however, the pentadecane content is lower so the composition of Example 1 is the preferred.

EXAMPLE 3

The process of Example 1 was repeated, except at a ratio of pentadecane to MICROSPONGE® of 50:50. The suspension was slightly oily and the water somewhat cloudy, indicating free pentadecane.

EXAMPLE 4

The process of Example 1 was repeated, except at a ratio of pentadecane to MICROSPONGE® of 60:40. The suspension was oily, the water quite cloudy, and it became thickened when exposed to temperatures below the freezing point of pentadecane indicating free pentadecane present in the slurry.

EXAMPLE 5

The process of Example 2 was repeated using POLYTRAP® 6603 in place of the MICROSPONGE® 5640. The resulting dispersion was not oily in appearance, but became thicker when cooled to below the melting point of the pentadecane.

EXAMPLE 6

The process of Example 5 was repeated except at a 50:50 ratio of pentadecane to POLYTRAP®. The slurry was thick and lumpy.

EXAMPLE 7

The process of Example 6 was repeated except that a 60:40 ratio of pentadecane: POLYTRAP® was used. The slurry was semisolid in nature.

EXAMPLE 8

The process of Example 2 was repeated, using DC 9503 in place of the MICROSPONGE®. The slurry was thick and oily.

EXAMPLE 9

The process of Example 8 was repeated except a 50:50 ratio of pentadecane to DC 9503 was used. The slurry was oily and thick and solidified on cooling to below the freezing point of pentadecane.

To provide further protection to the absorbed PCM's it is possible to overcoat the same. This is readily accomplished by coating the solid polymeric structure containing the absorbed PCM's by any conventional and standard coating or encapsulation process. Any water-soluble or water-insoluble wax and naturally occurring and synthetic polymer used for coating or encapsulation can be utilized to provide the outer coating. Examples are polyvinyl alcohol, alginates, carageenan, polyvinylidene chloride, ethyl cellulose, and the like.

The invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A heat transfer medium consisting essentially of heat transfer carrier liquid and one or more solid structures dispersed therein, said solid structures being selected from the group consisting of chemical absorbent comprising an amount of phase change material absorbed thereto and polymeric microporous structures comprising pores comprising said amount of phase change material entrapped therein;

wherein said amount of phase change material is effective to increase a property of said medium selected from the group consisting of heat capacity and heat transfer coefficient.

2. A heat transfer medium consisting essentially of heat transfer carrier liquid and solid chemical absorbent dispersed therein, said absorbent comprising an amount of phase change material absorbed thereto;

wherein said amount of phase change material is effective to increase a property of said medium selected from the group consisting of heat capacity and heat transfer coefficient.

3. A heat transfer medium consisting essentially of heat transfer carrier liquid one or more dispersed polymeric microporous structures comprising pores comprising an amount of phase change material entrapped therein;

wherein said amount of phase change material is effective to increase a property of said medium selected from the group consisting of heat capacity and heat transfer coefficient.

4. The heat transfer medium of claim 1 wherein said phase change material is insoluble in said medium.

5. The heat transfer medium of claim 2 wherein said phase change material is insoluble in said medium.

6. The heat transfer medium of claim 3 wherein said phase change material is insoluble in said medium.

7. The heat transfer medium of claim 1 wherein said phase change material is selected from the group consisting of at least one polyoxyethylene $C_{12}$ to $C_{18}$ ester, at least one paraffin, at least one polyethylene glycol, at least one decane of the formula $CH_3(CH_2)_xCH_3$ where x is from about 8 to about 17, and combinations thereof.

8. The heat transfer medium of claim 2 wherein said phase change material is selected from the group consisting of at least one polyoxyethylene $C_{12}$ to $C_{18}$ ester, at least one paraffin, at least one polyethylene glycol, at least one decane of the formula $CH_3(CH_2)_xCH_3$ where x is from about 8 to about 17, and combinations thereof.

9. The heat transfer medium of claim 3 wherein said phase change material is selected from the group consisting of at least one polyoxyethylene $C_{12}$ to $C_{18}$ ester, at least one paraffin, at least one polyethylene glycol, at least one decane of the formula $CH_3(CH_2)_xCH_3$ where x is from about 8 to about 17, and combinations thereof.

10. The heat transfer medium of claim 1 wherein said polymeric microporous structure is selected from the group consisting of acrylate copolymers, sintered colloidal silica particles, and open pored silicone polymers.

11. The heat transfer medium of claim 3 wherein said polymeric microporous structure is selected from the group consisting of acrylate copolymers, sintered colloidal silica particles, and open pored silicone polymers.

12. The heat transfer medium of claim 8 wherein said polymeric microporous structure is selected from the group consisting of acrylate copolymers, sintered colloidal silica particles, and open pored silicone polymers.

13. The heat transfer medium of claim 1 wherein said heat transfer carrier liquid is selected from the group consisting of an aqueous fluid, a silicate ester fluid, and a polyalphaolefin-based fluid.

14. The heat transfer medium of claim 2 wherein said heat transfer carrier liquid is selected from the group consisting of an aqueous fluid, a silicate ester fluid, and a polyalphaolefin-based fluid.

15. The heat transfer medium of claim 3 wherein said heat transfer carrier liquid is selected from the group consisting of an aqueous fluid, a silicate ester fluid, and a polyalphaolefin-based fluid.

16. The heat transfer medium of claim 8 wherein said heat transfer carrier liquid is selected from the group consisting of an aqueous fluid, a silicate ester fluid, and a polyalphaolefin-based fluid.

17. The heat transfer medium of claim 12 wherein said heat transfer carrier liquid is selected from the group consisting of an aqueous fluid, a silicate ester fluid, and a polyalphaolefin-based fluid.

18. The heat transfer medium of claim 3 wherein
    said heat transfer carrier liquid is a polyaphaolefin-based fluid;
    said polymeric microporous structure is an acrylate copolymer; and
    said phase change material is pentadecane.

19. The heat transfer medium of claim 1 wherein said solid structures comprise an outer encapsulating material effective to maintain separation of said phase change material and said medium in the event of release of said phase change material from said solid structures.

20. The heat transfer medium of claim 2 wherein said solid structures comprise an outer encapsulating material effective to maintain separation of said phase change material and said medium in the event of release of said phase change material from said solid structures.

21. The heat transfer medium of claim 3 wherein said solid structures comprise an outer encapsulating material effective to maintain separation of said phase change material and said medium in the event of release of said phase change material from said solid structures.

22. The heat transfer medium of claim 15 wherein said solid structures comprise an outer encapsulating material effective to maintain separation of said phase change material and said medium in the event of release of said phase change material from said solid structures.

23. An additive for a heat transfer composition consisting essentially of one or more solid structures selected from the group consisting of a chemical absorbent comprising an absorbate consisting essentially of phase change material, and a polymeric microporous structure comprising pores consisting essentially of entrapped phrase change material.

24. An additive for a heat transfer composition consisting essentially of one or more solid structures comprising a polymeric microporous structure comprising pores consisting essentially of entrapped phase change material.

25. An additive for a heat transfer composition consisting essentially of one or more solid structures comprising a chemical absorbent comprising an absorbate consisting essentially of phase change material.

26. The additive of claim 23 wherein said phase change material is selected from the group consisting of at least one polyoxyethylene $C_{12}$ to $C_{18}$ ester, at least one paraffin, at least one polyethylene glycol, at least one decane of the formula $CH_3(CH_2)_xCH_3$ where x is from about 8 to about 17, and combinations thereof.

27. The addictive of claim 24 wherein said phase change material is selected from the group consisting of at least one polyoxyethylene $C_{12}$ to $C_{18}$ ester, at least one paraffin, at least one polyethylene glycol, at least one decane of the formula $CH_3(CH_2)_xCH_3$ where x is from about 8 to about 17, and combinations thereof.

28. The additive of claim 25 wherein said phase change material is selected from the group consisting of at least one polyoxyethylene $C_{12}$ to $C_{18}$ ester, at least one paraffin, at least one polyethylene glycol, at least one decane of the formula $CH_3(CH_2)_xCH_3$ where x is from about 8 to about 17, and combinations thereof.

29. The additive of claim 23 wherein said polymeric microporous structure is selected from the group consisting of acrylate copolymers, sintered colloidal silica particles, and open pored silicone polymers.

30. The additive of claim 24 wherein said polymeric microporous structure is selected from the group consisting of acrylate copolymers, sintered colloidal silica particles, and open pored silicone polymers.

31. The additive of claim 23 wherein said solid structures comprise an outer encapsulating material effective to maintain separation of said phase change material and said medium in the event of release of said phase change material from said solid structures.

32. The additive of claim 24 wherein said solid structures comprise an outer encapsulating material effective to maintain separation of said phase change material and said medium in the event of release of said phase change material from said solid structures.

33. The additive of claim 25 wherein said solid structures comprise an outer encapsulating material effective to maintain separation of said phase change material and said medium in the event of release of said phase change material from said solid structures.

34. A composition consisting essentially of one or more microporous polymeric structures comprising an acrylate copolymer comprising pores consisting essentially of entrapped phase change material.

35. The additive of claim 34 wherein said solid structures comprise an outer encapsulating material effective to maintain separation of said phase change material and said medium in the event of release of said phase change material from said solid structures.

36. The additive of claim 34 wherein said phase change material comprises pentadecane.

37. The additive of claim 35 wherein said phase change material comprises pentadecane.

38. A method for making a heat transfer medium comprising:
    providing a medium comprising at least one heat transfer carrier liquid; and
    adding to said medium one or more solid structures comprising an amount of at least one phase change material, said solid structures being selected from the group consisting of chemical absorbent comprising said phase change material absorbed thereto and polymeric microporous structures comprising pores comprising said phase change material entrapped therein;
    wherein said amount of phase change material is effective to increase a property of said medium selected from the group consisting of heat capacity and heat transfer coefficient.

39. The method of claim 38 wherein said phase change material is selected from the group consisting of at least one polyoxyethylene $C_{12}$ to $C_{18}$ is ester, at least one paraffin, at least one polyethylene glycol, at least one decane of the formula $CH_3(CH_2)_xCH_3$ where x is from about 8 to about 17, and combinations thereof.

40. The method of claim 39 wherein said polymeric microporous structure is selected from the group consisting of acrylate copolymers, sintered colloidal silica particles, and open pored silicone polymers.

41. The method of claim 40 further comprising encapsulating said solid structures in an encapsulating material effective to maintain separation of said phase change material and said medium in the event of release of said phase change material from said solid structures.

42. The method of claim 38 wherein said medium consists essentially of said heat transfer carrier liquid, said one or more solid structures, and said phase change material.

43. The method of claim 38 wherein said solid structures consist essentially of said phase change material.

44. The method of claim 42 wherein said solid structures, consist essentially of said phase change material.

* * * * *

UNITED STATES PATENT AND TRADEMARK OFFICE
CERTIFICATE OF CORRECTION

PATENT NO. : 6,284,158 B1
DATED : September 4, 2001
INVENTOR(S) : Marshall et al.

Page 1 of 1

It is certified that error appears in the above-identified patent and that said Letters Patent is hereby corrected as shown below:

Column 8,
Line 38, please delete "A" before the word composition and insert -- An additive for a heat transfer --.

Column 10,
Line 8, please delete the comma after the word "structures."

Signed and Sealed this

Fourteenth Day of May, 2002

*Attest:*

*Attesting Officer*

JAMES E. ROGAN
*Director of the United States Patent and Trademark Office*